United States Patent
Itoh (10) Patent No.: US 6,176,647 B1
(45) Date of Patent: Jan. 23, 2001

(54) INSTRUMENT FOR MEASURING MASS FLOW RATE OF POWDER, AND ELECTROSTATIC POWDER COATING APPARATUS UTILIZING THE SAME

(75) Inventor: Tsutomu Itoh, Tokyo (JP)

(73) Assignee: RID Corporation, Tokyo (JP)

( * ) Notice: Under 35 U.S.C. 154(b), the term of this patent shall be extended for 0 days.

(21) Appl. No.: 09/077,165

(22) PCT Filed: Sep. 22, 1997

(86) PCT No.: PCT/JP97/00363

§ 371 Date: May 21, 1998

§ 102(e) Date: May 21, 1998

(87) PCT Pub. No.: WO98/13673

PCT Pub. Date: Apr. 2, 1998

(30) Foreign Application Priority Data

Sep. 24, 1996 (JP) .................................................. 8-287243

(51) Int. Cl.[7] ............................. B65G 51/36; B65G 53/66
(52) U.S. Cl. .................................. 406/31; 406/14; 406/39; 406/93; 406/176; 406/180; 406/185; 406/194; 406/195; 406/46
(58) Field of Search ................................. 406/31, 14, 176, 406/180, 93, 46, 194, 195, 185, 39

(56) References Cited

U.S. PATENT DOCUMENTS

| 4,743,143 | 5/1988 | Nagasaka | 406/14 |
| 4,900,199 | * 2/1990 | Spaulding et al. | 406/14 |
| 5,487,624 | * 1/1996 | Toyota et al. | 406/14 |

* cited by examiner

Primary Examiner—Christopher P. Ellis
Assistant Examiner—Jeffrey A. Shapiro
(74) Attorney, Agent, or Firm—Price, Heneveld, Cooper, DeWitt & Litton (57) ABSTRACT

A miniaturized, inexpensive instrument for measuring the mass flow rate of powder, which is capable of directly outputting the mass flow rate of powder and whose characteristics are not influenced by the kind and physical properties of the powder. The instrument can be easily manufactured, installed, operated, maintained, and color change can be easily done. A constant powder feeder, which is constructed based on this instrument and an electrostatic powder coating system utilizing this feeder has a high performance and a high operational efficiency. A measuring gas with a regulated flow rate is turned into a thin-layer of high-speed gas jets by a dispersion means, thereby powder is cross-dispersed and introduced into a measuring tube, the pressure difference generated therein is measured, and a feeding means is subject to feedback control so that the output of the pressure difference coincides with a set value.

15 Claims, 8 Drawing Sheets

C—C cross section

FIG. 4    PRIOR ART

FIG. 5 PRIOR ART

Mass Flow Rate = Feeding Bulk Density × Volumetric Flow Rate
= Feeding Bulk Density × (A × Rotation Speed of Screw)

It varies depending on every working site.

INSTRUMENT FOR MEASURING MASS FLOW RATE OF POWDER, AND ELECTROSTATIC POWDER COATING APPARATUS UTILIZING THE SAME

BACKGROUND OF THE INVENTION

1. Technical Field

The present invention relates to an instrument for measuring the mass flow rate of powder conveyed together with a gas, a constant powder feeder, which is easily manufactured, operated, maintained, and its operational efficiency is highly enhanced by applying the said instrument, and a high-performance electrostatic powder coating apparatus in which the constant powder feeder is utilized.

2. Background Art

Figure 4:
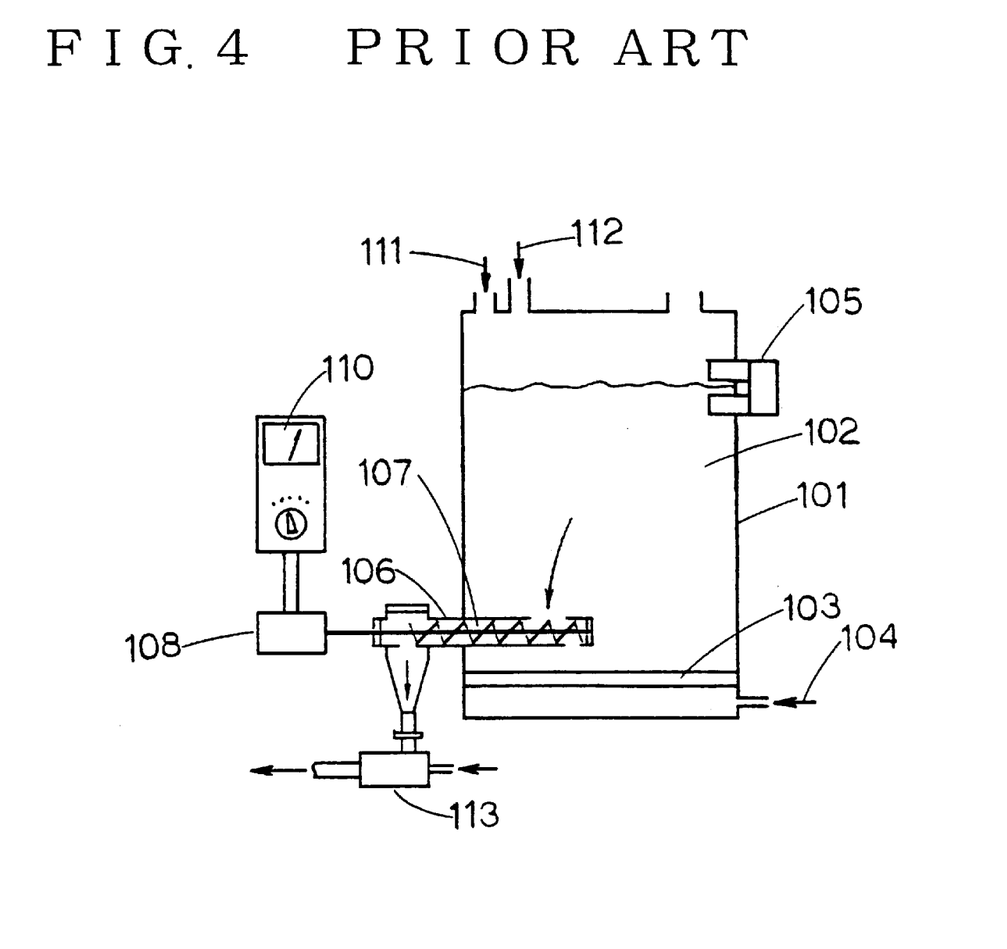
Figure 7:
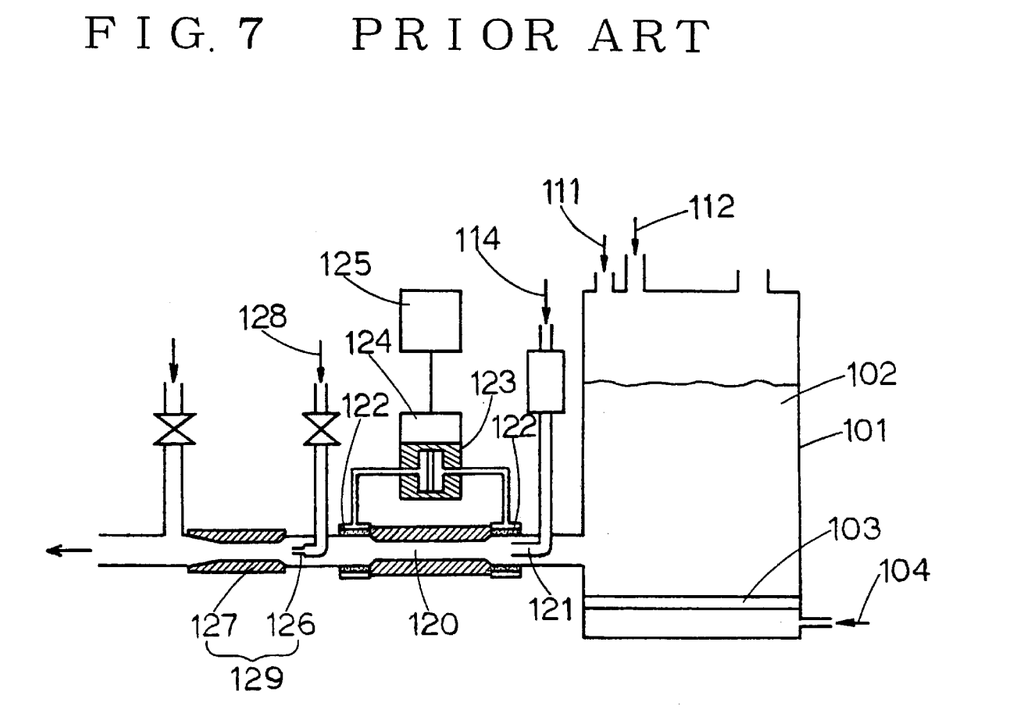

Conventionally, constant powder feed systems for pneumatically conveyed powder as shown in FIG. 4 and FIG. 7 of the accompanying drawings are known as being used for accurately feeding an expensive powder to each of several to several tens of apparatuses, with a relatively small amount of constant flow rate, e.g., several tens to several hundreds of grams per minute, as in the case of powder feed to powder coating apparatuses, thermal spraying apparatuses and the like.

FIG. 4 shows one example of a so-called volumetric type constant powder feeder, wherein powder 102 in a hopper 101 is fluidized by means of compressed air 104 through a porous plate 103 and fed by a screw feeder 106 provided at the bottom of the hopper 101 to an injector 113 where the powder material is fed to a powder gun by means of the injector 113.

At this time, the feeder is able to feed powder with a volumetric flow rate (Fv) represented by the following equation:

Volumetric flow rate $Fv=AR$ (cc/min.)

The equation is based on a constant which is determined by the volume of a screw, that is, [an effective volume per one pitch of the screw]=A (cc), and [the motor 108 rotation speed]=R/min. However, the feeding rate essentially required in the powder coating process is not a volumetric flow rate (cc/min.) but a mass flow rate (g/min.). Therefore, it is common to presume the mass flow rate by reflecting the actual bulk density S of the powder in the inside 107 of the screw feeder 106 (hereinafter referred to as feeding bulk density) using the following equation:

Mass flow rate $FM=SAR$ (g/min.)

Then, the mass flow rate is presumed by graduating the feeding rate indicator 110 on the motor rotation speed.

For the volumetric type constant powder feeder, it is an important point to avoid the influence of the powder level in the powder hopper upon the feeding bulk density S. In the embodiment shown in FIG. 4, a powder level controlling device 105 is provided for this purpose. Besides the above-described one, there are some other methods used for the purpose of insulating the influence of the powder level upon the feeding bulk density, but most of them adopt a method for fluidizing powder in a hopper. This situation is the same with respect to volumetric type constant powder feeders which utilize a table feeder, an eccentric pump, a roll with grooves and the like as a feeding means.

The loosened bulk density of a fresh powder that largely affect on the feeding bulk density S varies in the wide range of 0.4 to 0.75 g/cc depending on the kind of the powder. It sometimes varies by 3 to 5% by the production lot even in the same kind of powders. The feeding bulk density S is also affected by 5 to 15% depending on the fluidizing air flow rate. The reason for this is, besides the overall problem of the powder hopper, an air flow resistance that causes fluctuation by several percentage depending on the location of the porous plate 103 in case a plurality of screws are provided to one powder hopper. Since this situation directly affects the feeding bulk density, it necessiates checking the feeding bulk density for each screw, or in other words, an adjustment of the rotation speed for each screw in relation to the rotation speed and the on-site measuring of the feeding rate, as a constant feeding apparatus which is required to have the flow rate accuracy of ±2.5%.

In addition, the bulk densities of the fresh powder 111 and recovered powder 112 sometimes varies in the range of 0 to 25%. This situation directly affects on the feeding bulk density when the powder is recycled as common in many powder coating lines. Moreover, since the effect of the mixing ratio of the fresh powder and recovered powder is revealed through the transfer efficiency of the coating line, it is very difficult to maintain the accuracy of the feeding bulk density, or the accuracy of the feeder within ±2.5% especially in a multi-purpose coating line in which a variety of objects to be coated are handled, wherein the transfer efficiency thereof tends to vary.

Figure 5:
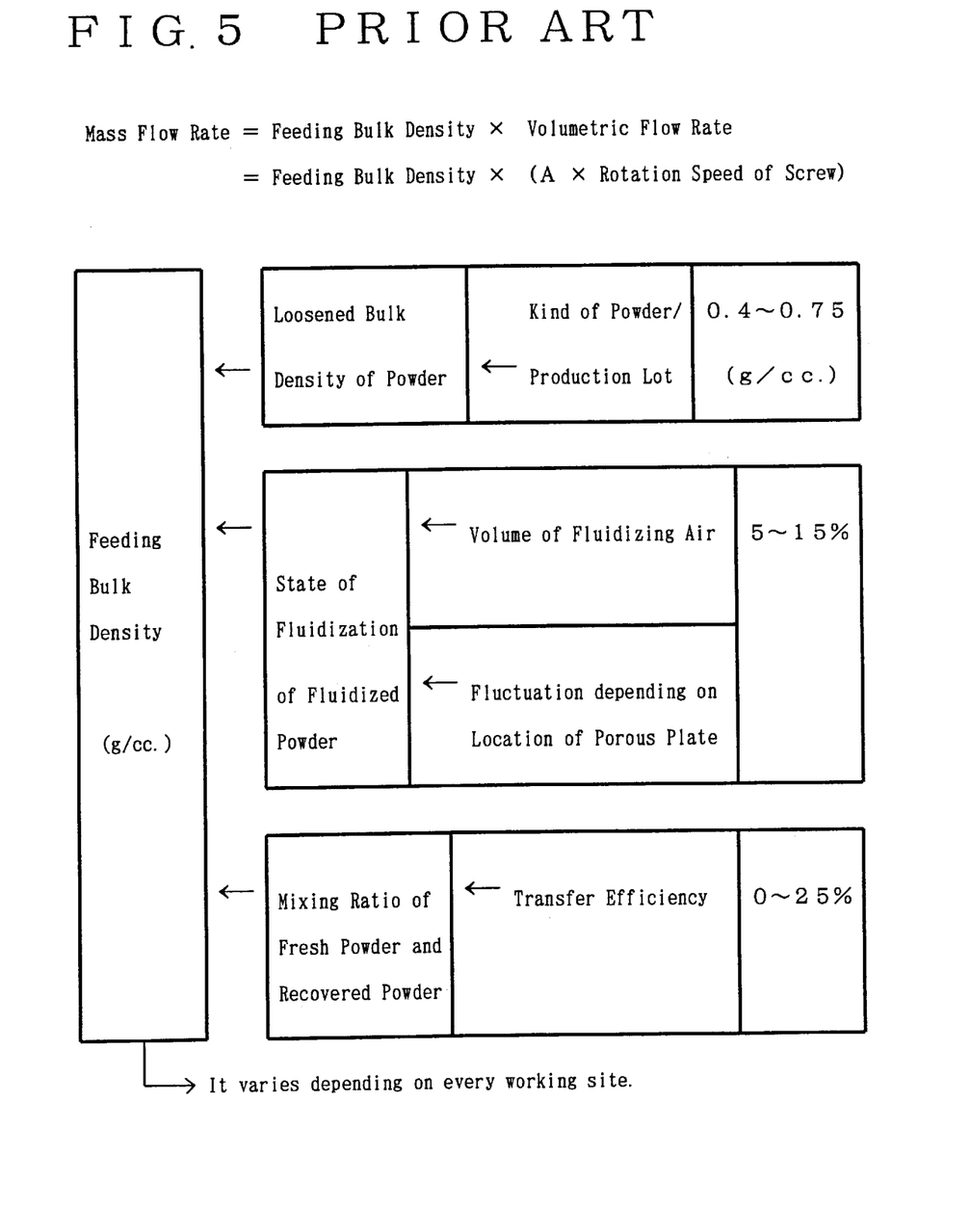
Figure 6:
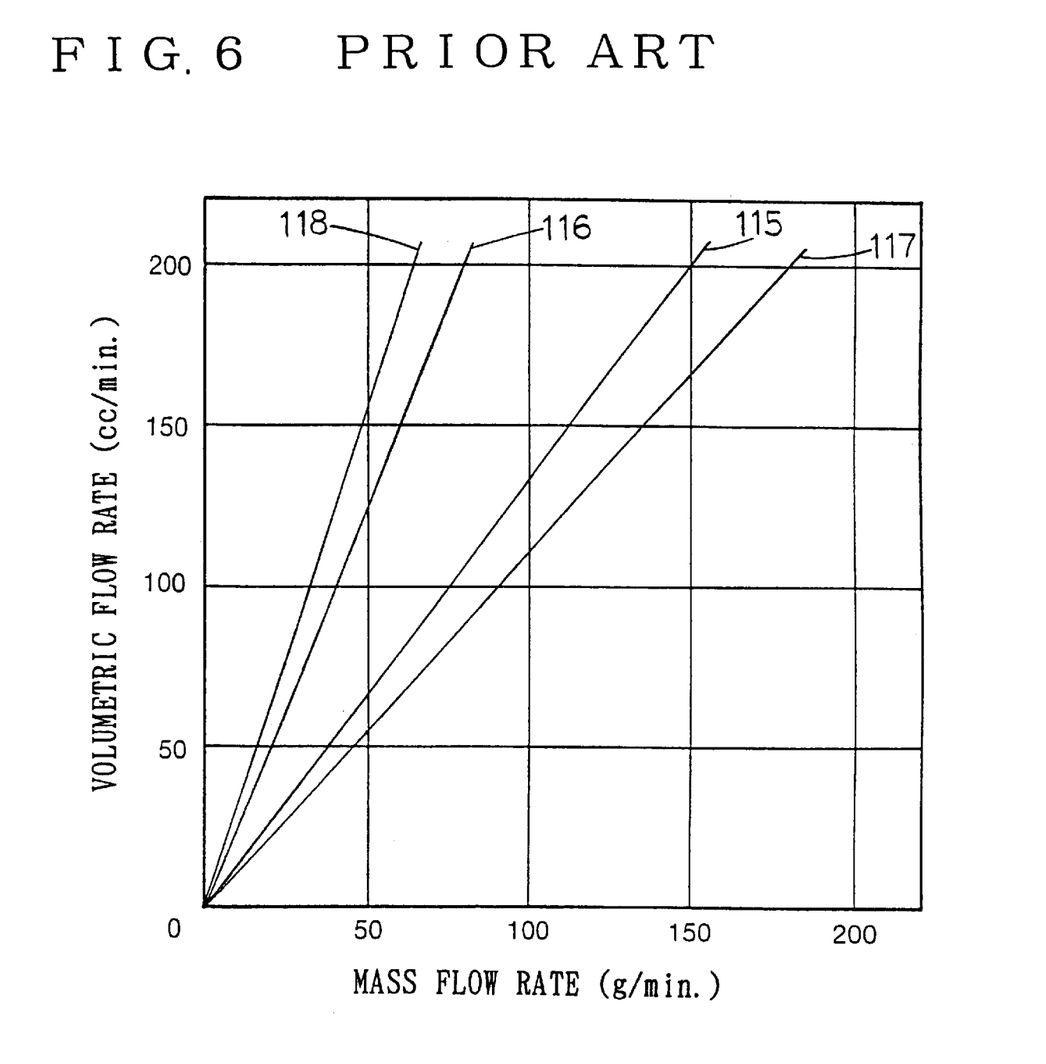

The mechanism and problems of the volumetric type constant powder feeder are summarized in FIG. 5. FIG. 6 shows the relation numerically. When the screw rotation speed is set to be constant, the relation between the volumetric flow rate and mass flow rate varies in a wide range of the area indicated between the lines 115 and 116. When taking into consideration of the influence of the state of fluidization and transfer efficiency of the coating line, probably the values vary in a wider range of the area indicated between the lines 118 and 117. For the purpose of determining the feeding bulk density that prescribes the volumetric flow rate, i.e., the relation between the rotation speed of the screw and the actually required mass flow rate, there is nothing for it but to regulate the actual flow rate of the practically used powder for each feeder, or for each screw in case of a multiple feeder, at a working site.

While a long period of working time and proficiency are required for this regulating work, it is not easy to always maintain a feeding accuracy of about ±2.5%. Thus, it is the first crucial problem common in volumetric type constant powder feeders. The volumetric type constant powder feeder, which can not be operated without regulating each apparatus individually depending on the practical working conditions on-site, can be hardly recognized as an industrial measuring and controlling equipment, therefore the creation of a new system that enables a direct detection and control of the mass flow rate of powder has been waited.

The screw feeder 106 as an apparatus having a volumetric type constant powder feeding function (hereinafter referred to as a volumetric type constant powder feeder) shown in FIG. 4 has such as complicated structure that the screw feeder requires dismounting and disassembling for having a cleaning at the time of color change of the powder together with the hopper. This requires a long period of working time and many hands. When a prompt color change is required, spare machines have to be prepared, which calls for a large amount of investment of equipment. The said difficulty in dealing with color change is the second problem of a volumetric type constant powder feeder. The same is true with respect to other systems which utilize a volumetric type constant powder feeder other than a screw feeder.

The third problem of the volumetric type constant powder feeder is that the screw feeder shown in FIG. 4 and other volumetric type constant powder feeding apparatuses are always large in size, heavy in weight, and expensive without exception. Furthermore, the space between neighboring volumetric type constant powder feeding apparatuses becomes so large that hoppers are required to be strongly constructed in a square shape with a high accuracy. As hoppers tend to be expensive, heavy and large-sized, they are inconvenient to carry, thereby hinder the operations such as color change at working sites. It is also practically impossible to streamline the coating process inexpensively by adding the above-mentioned volumetric type constant powder feeder to the hoppers of already installed powder coating facilities.

FIG. 7 shows another example of the conventional art other than the above-mentioned volumetric type constant powder feeder. A desired powder feeding rate is obtained by the steps comprising: flowing a measuring gas 114 at a constant velocity into a measuring tube 120 by means of a nozzle 121; introducing a fluidized powder 102 in a hopper 101 into the measuring tube 120 so as to accelerate the powder; detecting the pressure difference generated between the inlet and outlet of the measuring tube 120 by means of a pressure difference sensor 123 which constitutes a fixed small volume blind tube via a filter 122; obtaining an output signal by an amplified signal processor 124; detecting the powder flow rate by observing the indicated feed rate of the powder (g/min.) on a display device 125; and automatically controlling the driving gas 128, from an injector 129 comprising a throat 127 and a nozzle 126, by an automatic control means (not shown in the figure).

In the conventional art shown in FIG. 7, the sensing characteristics of the powder feeding rate is not affected by the variation of the fluidizing air flow rate, since the flow rate of the air accompanied by the fluidized powder is by 1/100 or less in comparison with the flow rate of the measuring gas 114. Accordingly, the characteristics do not show practical changes depending on the attached position of the hopper or the hopper itself. However, with respect to common powder materials, the working curve showing the relation between the feeding rate at a set value and the actually measured feeding rate varies in the range of about ±7.5% as shown in the working curves 130 and 131 in FIG. 8. This depends on the kind of the powder, or the variation of the mixing ratio of the fresh powder and recovered powder, as a result an on-site regulation is necessary. Incidentally, when the flow rate of the measuring gas 114 has to be reduced due to some circumstances at a working site, there is also a problem that the sensor output declines downwardly, and deviates from a linear relation, and then shows a non-linear characteristic in the region where the powder feeding rate is high as shown in the working curve 132.

Figure 8:
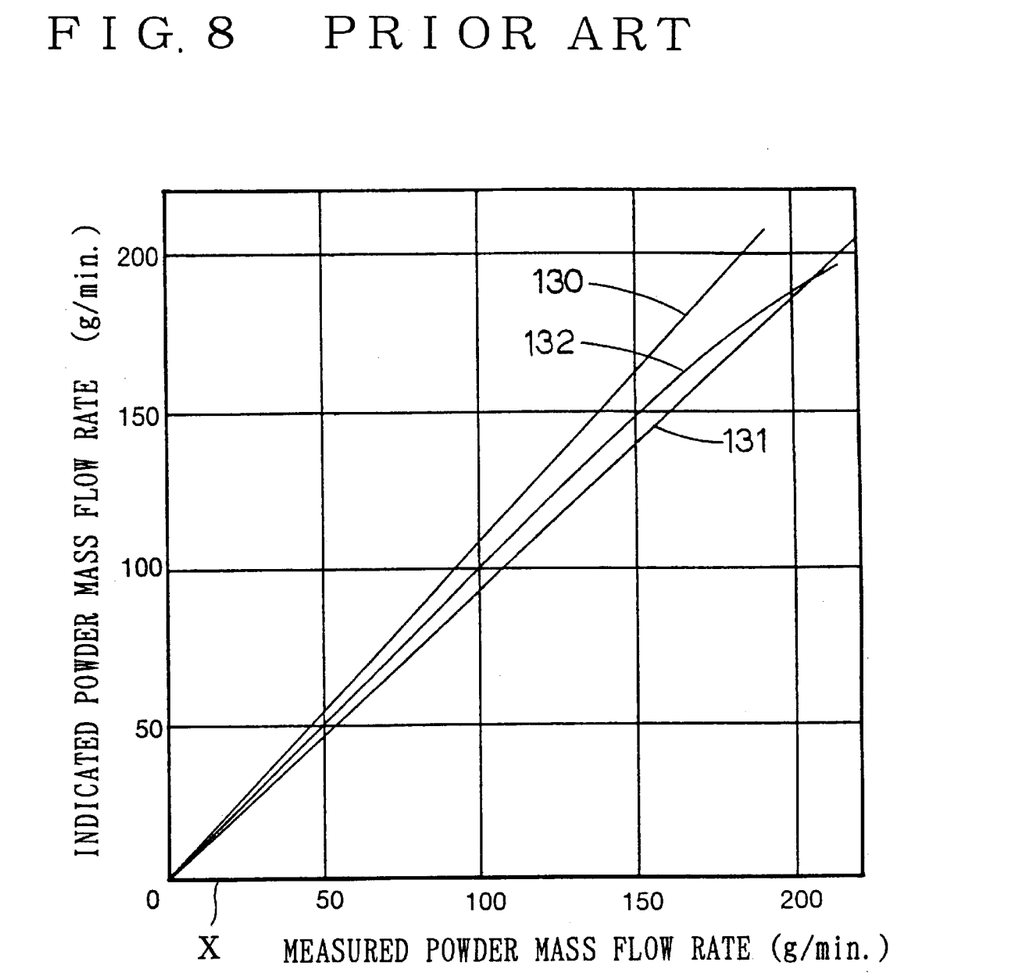

In the above-described conventional art with reference to FIG. 7 and FIG. 8, the powder is merely introduced and accelerated by the measuring gas in the measuring tube. Therefore, the degree of powder dispersion differs depending on the kind of the powder, thereby causing a difference in acceleration, as a result different working curves are obtained depending on the kind and physical properties of the powder as shown by 130 and 131 in FIG. 8. The reason why a nonlinear working curve as shown by 132 in FIG. 8 will be explained as follows. A linear characteristic curve is obtained in the range where a powder flow rate is small because powder dispersion is sufficiently done. But when the powder flow rate is high, the powder is not dispersed so sufficiently that the acceleration efficiency decreases, thereby the working curve deviates from the linear relation and bends toward the x-axis with respect to the constant powder feeder which is controlled by an automatic control system in which the pressure difference generated by the powder flow is kept constant. Additionally, in the conventional art illustrated in FIG. 7 and FIG. 8, because of insufficient powder dispersion, the powder flow in the measuring tube is downwardly biased in the horizontally placed measuring tube by the influence of the gravity, thereby creating a large velocity difference between the powder flow and the measuring gas flow. In other words, it results in an insufficient acceleratinon of the powder flow. In this case, there is a problem that a working curve varies depending on physical properties of the powder or operational conditions.

The object of the present invention is to solve the problems in the conventional art summarized in FIGS. 4, 5, 6, 7 and 8.

Another object of the present invention is to develop an instrument for measuring the mass flow rate of powder which is capable of obtaining a constant linear relational output against the powder mass flowing per unit time (g/min.), that is, powder mass flow rate without the influence due to the kind and physical properties of the powder, thereby obtaining a sensor based feed-back system, or a constant powder feeder, for automatically controlling the output to coincide with a prescribed value.

SUMMARY OF THE INVENTION

The first method for attaining the object of the present invention is to provide a powder flow rate measuring system comprising the steps of:

introducing powder to be measured into a measuring gas flow formed in a measuring tube with a constant flow rate, measuring a mass flow rate of the powder by a pressure difference between the inlet and outlet of the measuring tube, the pressure difference being generated by allowing the measuring gas to accelerate the powder flow in the measuring tube, wherein the measuring gas accompanying the powder is introduced into the measuring tube by dispersion means which is capable of dispersing the powder into the measuring gas sufficiently at just in front of the inlet of the measuring tube.

In the second method, a pressure difference sensor system in which a small volume blind tube is formed at both sides of a substantially solid pressure receiving diaphragm is utilized as measuring means by a filter.

In the third method, the inner surface of the measuring tube is formed with a non-adhesive material such as a fluororesin.

In the fourth method, the gas flow distribution and the powder dispersion in the measuring tube is made to be axially symmetrical and stable, wherein a uniform turbulence is formed and the powder is uniformly dispersed along the entire length in the measuring tube by generating a turbulent flow of the measuring gas by the dispersion means in the first method described above at the inlet of the measuring tube along with by adjusting the Reynolds number of the air in the measuring tube to be 2,300 or more.

The speed of the powder particles at the outlet of the measuring tube is not affected by the physical properties of the powder, thus enabling to be accelerated at a substantially same speed as the speed of the measuring gas in a common powder, and generating the same pressure difference against the same flow rate (g/min.) of the powder by applying the four methods described above. In other words, it became possible to measure the mass flow rate of the powder conveyed by the air.

Figure 1:
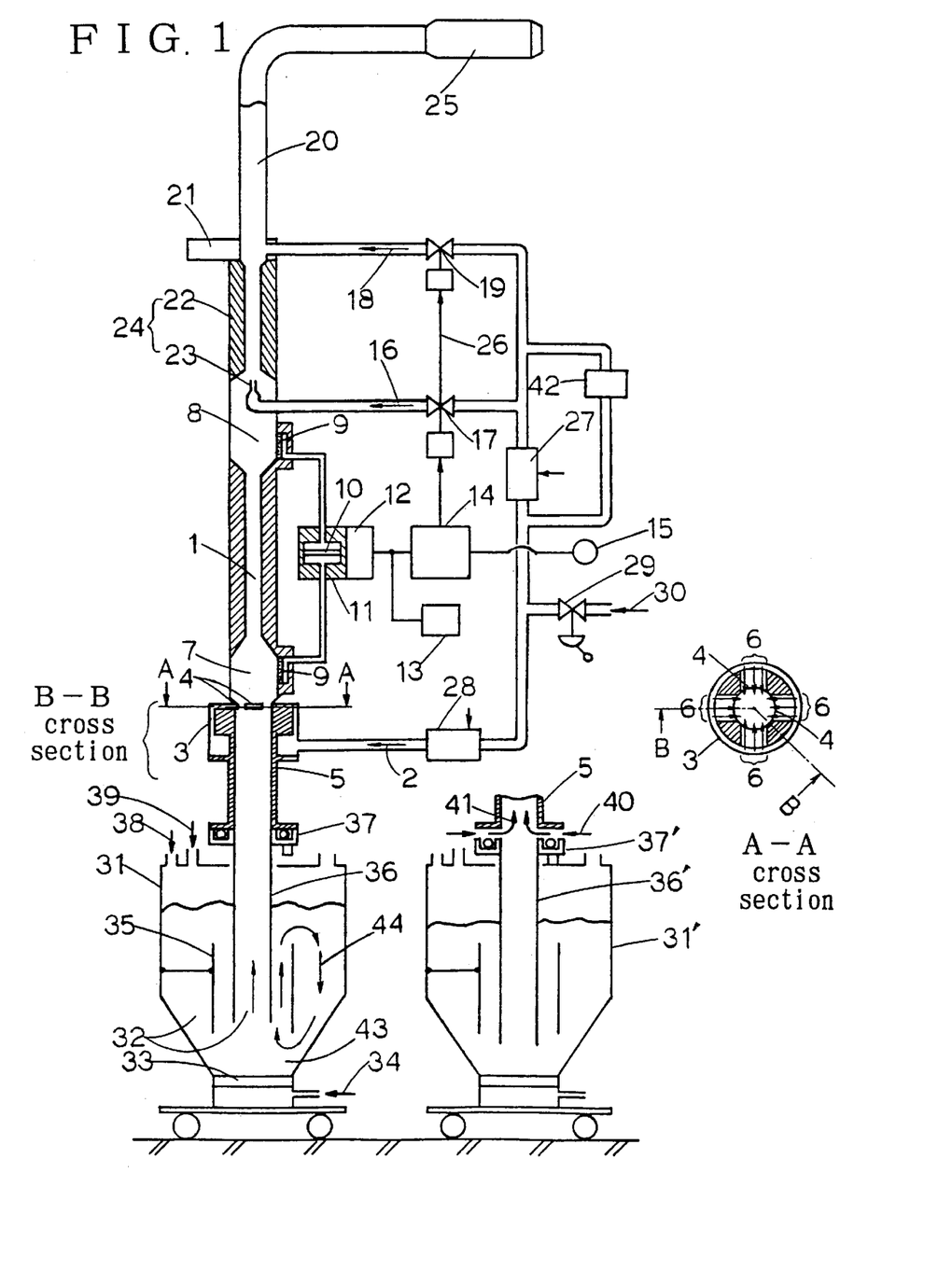

In the dispersion means as the main of the four methods described above for sufficiently dispersing the powder material with a measuring gas at just in front of the measuring tube, the measuring gas is cross-sprayed as high-speed thin-layer gas streams with a speed of 15 to 50 m/sec from the circumference of the cylindrical powder column to its center axis at near the outlet of the powder material introduction means that is coaxial with the measuring tube and usually comprises a circular pipe to feed the powder material as a bulk or in a fluidized state via a small space. Consequently, the powder can be dispersed into independent single particles in the measuring gas even when the measuring gas flows at a small velocity required according to the circumstances of the overall structure of the constant powder feed system, by successively shearing off the terminal end of the column of the powder material fed at a slow feeding speed of about 5 to 20 cm/sec into thin layers by a turbulent shear force of the measuring gas. Because the powder is sent into the measuring tube by being accompanied by the measuring gas and is uniformly distributed in the measuring tube in cooperation with the foregoing fourth method, all the fine particles with a particle size of 75 $\mu$m or less, which comprises the particle size of most common powders, and having a net specific gravity in the range of 0.9 to 1.65 are substantially accelerated up to the same velocity as the velocity of the measuring gas in the measuring tube. Consequently, the pressure difference between the inlet and outlet of the measuring tube having one-to-one correspondence with the mass flow rate of the powder is generated irrespective of the kind of the powder, or physical properties of the powder, thereby completing the present invention.

According to the present invention, with respect to common powders, an instrument for measuring the mass flow rate of powder, which is capable of measuring the mass flow rate and whose characteristics are not influenced by the physical properties or kind of the conveyed powder can be obtained. By combining this instrument with an automatic powder feeding control system, it is possible to obtain a constant powder feeder, which is not influenced by the operational conditions and physical properties of the powder, and which is capable of constantly maintaining a high precision without requiring an on-site checking and adjustment. The instrument of this invention is simple in structure and small in size, comprising a connection of circular pipes made of a non-adhesive material without any built-in members or movable parts, and the instrument is detachably connected with the hopper. Therefore, it is possible to clean the interior of the instrument by detaching the instrument from the hopper, then sucking the fresh air and let the air go through the inside of the instrument at the high speed. As the result, disassembling operation becomes unneccesary and a one-touch color change operation becomes possible. Moreover, since the instrument is small in size, and it does not require a hopper to have any special structure, it is possible to introduce the instrument into an already operating powder coating line for streamlining purpose without requiring a big change to the existing product system.

BRIEF DESCRIPTION OF DRAWINGS

FIG. 1 is a front view of the instrument for measuring the mass flow rate of powder and a part of the electrostatic powder coating apparatus utilizing the instrument illustrated by cross sections according to the present invention.

FIG. 2 is a graph indicating one example of the working curve for the instrument for measuring the mass flow rate of powder having the structure shown in FIG. 1.

FIG. 3 is a detailed drawing of a part in FIG. 1.

FIG. 4 is an illustrative drawing of a volumetric type powder feeder according to the prior art.

FIG. 5 is an illustrative chart of a volumetric type powder feeder according to the prior art.

FIG. 6 is a graph indicating the relation between the volumetric flow rate and mass flow rate of the volumetric powder feeder according to the prior art.

FIG. 7 is a part of the front view of the main part of the powder feeder according to another prior art illustrated by a cross section.

FIG. 8 is a graph indicating one example of the working curve of the powder feeder shown in FIG. 7.

DETAILED DESCRIPTION OF THE PREFERRED EMBODIMENT

FIG. 1 shows the structure of the constant powder feed system for powder coating, utilizing the instrument for measuring the mass flow rate of pneumatically conveyed powder (=a powder mass flow meter) according to the present invention, and one example of the method for cleaning the interior thereof. FIG. 2 shows the characteristics of the constant powder feed system according to the present invention.

As shown in FIG. 1, an injector 24 comprising a throat 22 and nozzle 23 driven by a controlling gas 16 is connected to the outlet 8 of the measuring tube 1 whose inner surface is made of a non-adhesive material such as a fluororesin. A powder 32 in the inner cylinder 35 of a hopper 31 fluidized via a porous plate 33 is elevated by means of a compressed air 34 into the powder introduction means 5 through a suction pipe 36 as a bulk powder column containing a small amount of air. A measuring gas 2 with a prescribed flow rate is supplied to a dispersion means 3 provided in the vicinity of the top end of powder introduction means 5, and the measuring gas is blown and intersected with the powder, thereby forming thin-layer of high-speed air streams 6 (illustrated by twelve arrows (3×4) in the cross section A—A) with a flow speed of 15 to 50 m/sec, blown through very thin slits 4 provided at the top end of the dispersion means 3, in the direction from the circumference to the center of the top end of the bulk powder column elevating through the powder introduction means 5. In this way, the terminal end of the column of the powder as described above is successively sheared off into thin layers by a turbulent shear force. Then the powder assumes a dispersed state as independent single particles suspended in the measuring gas, then blown into the measuring tube 1. When the inner diameter of the measuring tube 1 and the flow speed of the measuring gas 2 is appropriately selected to adjust the Reynolds number in the measuring tube to be 2,300 or more, a linear relation is observed between the pressure difference between the inlet 7 and outlet 8 of the measuring tube 1 and the mass flow rate (g/min.) of the powder passing through the measuring tube 1, irrespective of the kind and physical properties of the powder with an accuracy of ±2.5% as shown in FIG. 2 with respect to common powders. In other words, measurement of the mass flow rate is made possible. Even in case that the Reynolds number of the measuring gas in the measuring tube has to be set to 2,300 or below in relation to other auxiliary equipment, the powder mass flow meter according to the present invention is hardly affected by the physical properties of the powder or by the operational conditions as compared with the conventional art. While the embodiment in FIG. 1 shows the case where the thin-layer high-speed gas streams 6 are blown so as to cross orthogonally with the flow of the powder, another appropriate crossing angle can be selected, if necessary.

Figure 2:
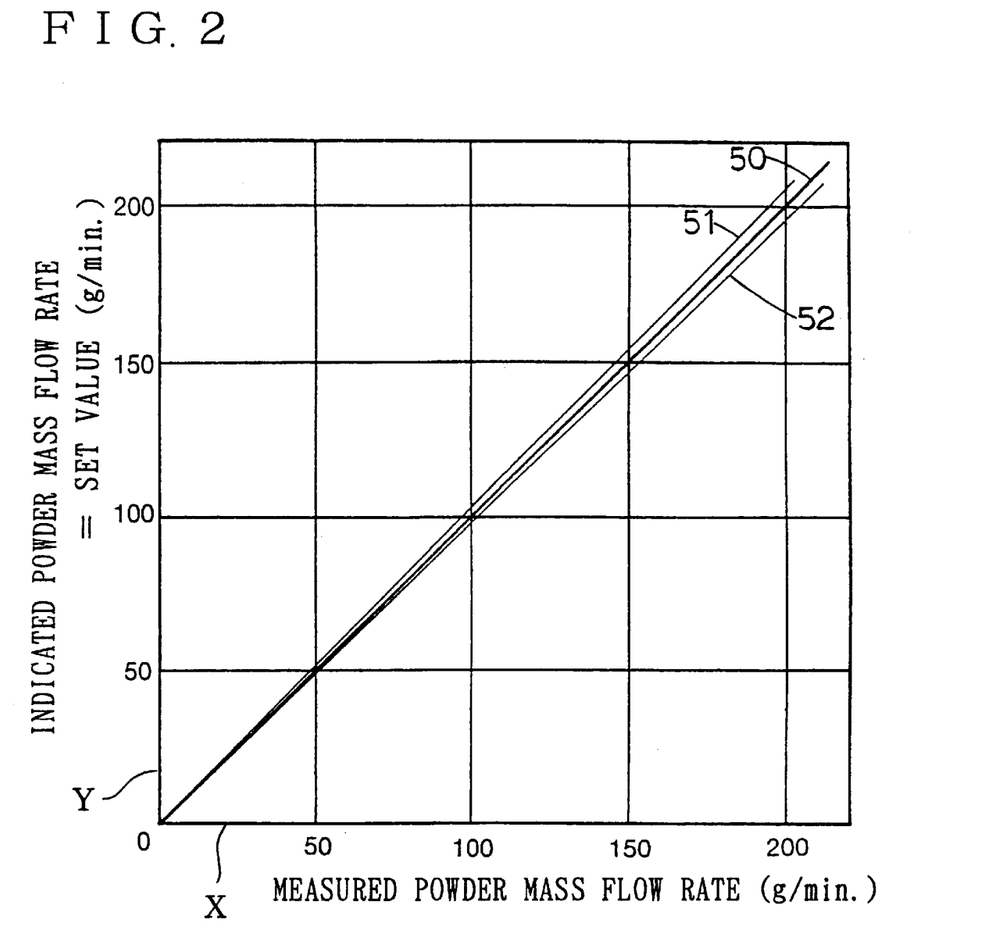

In FIG. 2, the actually measured values (g/min.) of the mass flow rate, which are gravimetrically measured by sampling the powder passing through the measuring tube 1 within a given period of time, are plotted on the x-axis. The indicated values are plotted on the y-axis, which are obtained by the values of the pressure difference between the inlet 7 and outlet 8 of the measuring tube 1 detected by a pressure difference sensor 11 via a filter 9 and displayed by a display device 13 via an amplifier 12. The mass flow rate can be obtained from the indicated value by means of the working curves 51 and 52 showing the relation between the measured values and the indicated values.

In FIG. 2, with respect to common powders, the characteristics of the powder mass flow meter according to the present invention can be represented by a single working curve 50 of y=x. Each working curve corresponding to respective powder is laid in the area surrounded by the working curve 51 having a slope by +2.5% and the working curve 52 having a slope by −2.5% against the working curve 50, thereby making it possible to apply the working curve 50 as a representative working curve without necessitating any on-site actual measuring. According to the present invention, the mass flow rate of common powders can be measured with an accuracy of ±2.5% by measuring the pressure difference between the inlet and outlet of the measuring tube, this accuracy being sufficient for making a great effect on saving the powder in the powder coating process, for making the coated film thickness uniform, for improving the powder transfer efficiency and for saving labor.

The most crucial point enabling the practice of the present invention is that, with respect to common powders, i.e., the powder having an average particle size of 10 to 50 $\mu$m and the net specific gravity of 0.9 to 1.7, all the powder particles can be accelerated to the same speed as the speed of the measuring gas in the measuring tube 1 at the inlet of the measuring tube 1 provided that the powder is sufficiently dispersed by the measuring gas 2. However, in the practical equipment, for example, as shown in FIG. 1, the flow rate of the measuring gas 2 is limited within 5 to 20 liters/min since the performance of the injector 24 is deteriorated when the flow rate of the measuring gas 2 is increased. Accordingly, it is required to realize a perfect dispersion within this range. For the purpose of dispersing the powder with a flow speed of 250 to 500 g/min that is required for the usual powder coating process under the measuring gas flow rate as small as described above, acceleration of the flow speed of the measuring gas is first of all required. There is no choice but to spout out the measuring gas so as to form a thin-layer gas stream so that the powder is made to contact with the measuring gas with a wide contact area, and cross-dispersed with the measuring gas, thereby realizing a desired dispersion ability to achieve the present invention. The problem of an impact fusion can be avoided in this dispersion means because there is no obstacle, such as a tube wall, where the powder material dispersed in the measuring tube and conveyed by the measuring gas would directly collide with. Moreover, the initial speed of the dispersed powder at the inlet of the measuring tube 1 because the measuring gas 2 does not have the speed distribution along the axial direction of the measuring tube 1, thereby diminishing a margin of error in the pressure difference generated at the measuring tube to a degree of practically negligible level.

A vortex air flow method and a parallel air flow method are generally used for dispersing powder or liquid by a high speed air flow other than the method according to the present invention. In the dispersion method using a vortex air flow, the measuring gas 2 forms a vortex air flow in the measuring tube 1 which generates a large pressure difference that is harmful for measuring the mass flow rate of powder, and also the powder is biased in the vicinity of the tube wall due to the centrifugal force generated by the vortex air flow. Then a one-to-one correspondence between the energy consumption for accelerating the powder and the pressure difference generated in the measuring tube 1 is lost, thereby making it difficult to measure the mass flow rate. In the parallel air flow method that is the other dispersion method, the contact area between the air flow and the powder can not be made so large that a sufficient dispersion effect can not be expected, thereby the effect due to the kind and physical properties of the powder can not be avoided. The conventional art shown in FIG. 7 and FIG. 8 belong to this category. While a collision-dispersion method by a high-speed gas flow can be also used for dispersing powder by a gas, application of this method is not recommended in the powder having a low glass transition point because it may cause an impact fusion.

In FIG. 1, a pressure difference sensor 11 inside of which minute volume blind tubes are formed with a filter 9, at the both sides of a pressure receiving membrane 10 made of a solid material is applied for detecting the pressure difference at the inlet 7 and outlet 8 of the measuring tube 1. The controlling gas 16 supplied to the injector nozzle 23 is adjusted by a feed back control of the control valve 17 using an amplified output of the difference obtained by comparing the output of an amplifier 12 with its set value of a reference circuit 15 at a regulator 14. By adjusting the pressure difference between the inlet and outlet of the measuring tube, which corresponds to the mass flow rate (g/min.) of the powder equal to the set value of the reference circuit 15, the mass flow rate of the powder can be always adjusted equal to the set value.

Figure 3:
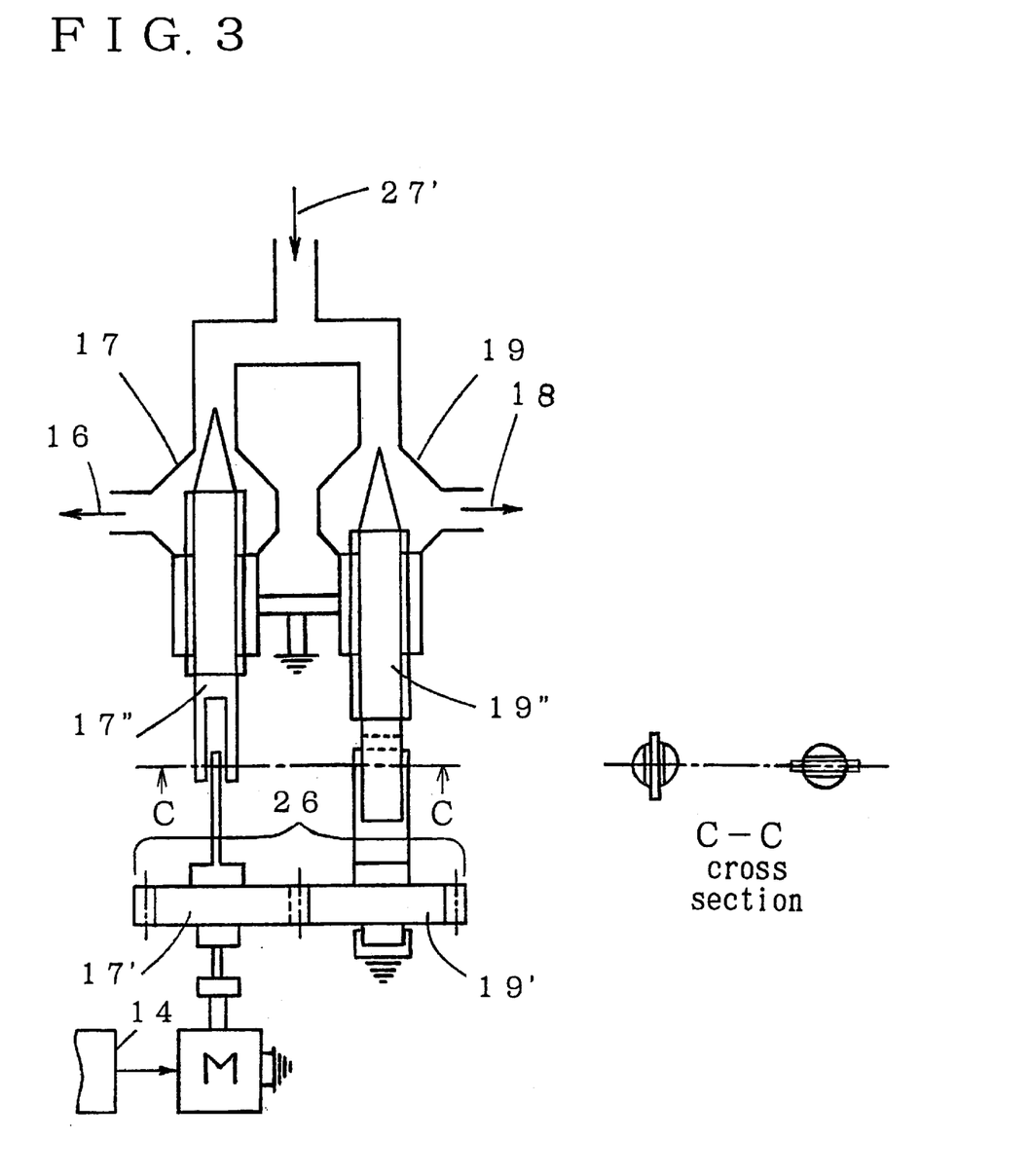

While the regulator 14, control valves 17 and 19, injector 24 and hopper 31 are assembled as parts of the powder mass flow meter system in the foregoing description, the system comprising the parts indicated by the reference numerals 1 to 20, 31 and 37 is generically called a constant powder feeder. There may be a case that the flow rate of the controlling gas 16 may be fluctuated during control in the constant powder feeder in FIG. 1 causing undesirable effects for operating the powder gun 25, or may be another case that the combined volume of the measuring gas 2 and controlling gas 16 may be insufficient for the gas volume for conveying the powder material in the pipe 20. For solving these problems, auxiliary air 18 is blown into the outlet of the injector 24 via the control valve 19. For such cases, in the embodiment as shown in FIG. 1, the constant flow valve 27 is applied for maintaining the conveying air flow in the pipe 20 at a prescribed value so that the conveyed air volume in the pipe 20 is always kept constant in compliance with the set value of the constant flow valve 27 even when the air flow resistance at the downstream of the valve is changed by the action of the control valves 17 and 19. Since the control valve 19 is desirably operated in a reverse relation to the control valve 17, the control valve 19 may occasionally be utilized with a reverse motion interlocked with the motion of the control valve 17 by means of an interlock means 26. The reverse motion means that, when the control valve 19 is opened, the control valve 17 is closed responding to the motion of the control valve 19. In the valves 17 and 19 interlocked with each other by spur gears 17' and 19' as shown in FIG. 3, for example, when one of the valve member 17" is rotated by being driven with a motor responding to the output of the controller 14 to close the valve by means of a screw in the valve member 17", the other valve member 19" is inversely rotated by the spur gear 19' to open the valve, thereby the compressed air 27' from the constant flow valve is controlled to increase either one of the output flow 16 or 18 and to decrease the other, or vice versa, thus readily realizing the reverse motion. In other words, the interlock means in FIG. 1 is embodied in a pair of the spur gears 17' and 19' in FIG. 3. However, when the control valve 19 is previously adjusted to have an appropriate fixed aperture, the conveying air flow in the pipe 20 can be adjusted to a constant value in a wide range of the powder mass flow not to affect practical purposes. When the convey speed is not required to be strictly adjusted, the constant flow valve 27 is not always necessary. The compressed air 30 to be used in this system is usually supplied from a constant pressure source via an accurately controlled constant pressure valve 29, making the operation of the constant flow valve 27 easy. The flow rate of the measuring gas 2 to be used as a reference of the operation of this system is set to a desired flow rate by a setting valve 28 connected to the pressure source described above.

Since the detection characteristic of the powder flow rate is not affected by the physical properties of the powder in the constant powder feeder according to the present invention, the powder feeding rate never varies beyond an accuracy of ±2.5% even when the physical properties of the fresh powder 38 and recovered powder 39 fed into the hopper 31 is different with each other and the mixing ratio between them is changed. Even when the flow rate of the compressed air 34 for use in fluidization is changed and the change is directly transferred into the air accompanied by the powder material in the bulk powder introduction means 5, the change is a negligible level of as low as 0.5% or less as compared with the speed of the measuring gas in the measuring tube. When the air for fluidization is changed along with changing the expansion coefficient of the fluidized powder in the range of 0 to 50%, the change below 1/200 relative to the flow rate of the measuring gas—usually about 10 liters/min—does not influence on the speed of the measuring gas in the measuring tube. For these two reasons described above, neither the detection characteristics of the measurement nor the feeding characteristics are influenced by the fluidized air with respect to the mass flow meter and the constant powder feeder according to the present invention. By the same reasons above, the constant powder feeder according to the present invention can be operated by utilizing a hopper using no fluidizing air, that is, merely a bulk type hopper can be utilized with respect to common powders, provided that the powder is securely fed to the inlet of the suction pipe by a vibration means of the hopper.

For detecting the pressure difference between the inlet 7 and outlet 8 of the measuring tube 1, in FIG. 1, it is advantageous to use a semiconductor type pressure difference sensor by forming minute volume blind tubes, of which inside volume is invariant, at both sides of a pressure receiving membrane 10 made of a substantially solid substance such as silicon membrane via a filter 9 comprising a non-adhesive substance such as a fluororesin having a lot of very fine air permeable holes. Owing to this structure, the volume of the air passing through the filter during pressure changes is very small and the average time interval for the pressure change approaches zero, the powder never invades into the filter but deposits on the outside of the filter and forms a thin layer. As the volume of the inside of the sensor is so small that it is also made possible to securely detect the pressure difference of the gas including the powder for a long period of time through the thin deposit layer of the powder and the filter.

In FIG. 1, it has been already mentioned that the inner surface of the measuring tube 1 and filter 9 is composed of a non-adhesive substance such as a fluororesin, the portion making a contact with the powder in the dispersion means 3, inlet 7 and outlet 8, and inside of the injector 24 are also in general composed of a non-adhesive substance as well, making the time required for changing the color of the powder of the entire constant powder feeder very short. The constant powder feeder under operation is sucking up the powder material from the hopper by being closely connected to the suction pipe 36 through a seal device 37 by means of a fastener (not shown in the figure). A color change operation of the powder is carried out by the steps comprising:

halting a compressed air source 30 of the constant powder feeder for a while;

releasing the fastener to separate the suction pipe 36 and seal device 37 off the bottom end of the powder material introduction means 5 as shown by the suction pipe 36' and seal device 37' in a different hopper 31' as shown in FIG. 1;

full-opening the control valve 17 while opening the valve 42 that is closed during the operation; and starting to feed through the compressed air source 30 again. The hopper 31' is separated from the system by the procedure described above, preventing the overall system from conveying the powder material, thereby largely increasing the suction power of the injector 24. A large volume of clean air 40, 41 is sucked from the bottom end of the powder introduction means 5 to pass through the interior of the nozzle, measuring tube and injector in high speed together with the measuring gas 2, controlling gas 16 and auxiliary air 18. Since each part described above is formed into a circular pipe structure made of a non-adhesive material and connected in series with each other with no internal structures therein, the remaining powder after the operation can be cleaned off without disassembling the system, thereby immediately completing the preparation for color change of the powder. Then, the hopper for the last operation is replaced with the hopper containing powder for use in the next operation (hereinafter abbreviated as "next powder") followed by connecting the powder introduction means 5 of the constant powder feeder with the suction pipe of the next powder hopper, immediately starting the operation by using the next powder. Accordingly, no spare facilities for changing the color of the powder are needed. When the inside of the pipe 20 between the injector 24 and powder gun 25 is made of a non-adhesive substance such as a fluororesin and the pipe is not so long in the method for changing the color of the powder according to the present invention described above, the color change of the paint of the constant powder feeder and pipe 20 can be simultaneously carried out at one time. However, when the pipe is very long despite its interior is made of a non-adhesive substance, or when the substance is not non-adhesive, a pipe cleaning means 21 is provided separately. It means that another means not hindering the cleaning of the foregoing constant powder feeder is added, for example, blow-in of a compressed air for use in the pipe cleaning, suction of a separately prepared air for use in the pipe cleaning, or replacement of the pipe 20. While these means are applied between the injector and the tip of the gun, in FIG. 1 they were illustrated at the outlet of the injector for convenience.

Usually, a constant powder feeder is often applied to a multi-gun system in a large scale coating line. The constant powder feeder according to the present invention can be arranged into a package of connection/separation system by assembling a plurality of suction pipes 36 together with respective seal means 37 into one unit, or by collecting the lower end of respective powder introduction means 5 into one pipe to serve as respective manifold, making it easy to automatically control the system by an air pressure operation or electromagnetic operation. In general, the powder may be simply sucked up by a hose from the top of the fluidized or vibrated powder hopper. As shown in FIG. 1, in many cases it is not necessary to fixedly connect the constant powder feeder with the hopper, as the shape, size, accuracy and strength of the hopper to be used in the present invention can be quite freely designed so that the hopper has a simple structure with a light weight and low cost. Accordingly, no heavy economic load is imposed on preparing a hopper for each of powder colors along with making a color change operation easy and the operation can be easily automated. Moreover, neither remodeling nor replacement of the hopper is needed in adding the constant powder feeder according to the present invention to already installed hoppers in the facilities under operation for the purpose of rationalization, resulting in a quite easy work and low cost. With respect to the powder hopper besides a conventional fluidization type hopper having a porous plate over the entire bottom, any hoppers may be used, for example, as shown in FIG. 1, a hopper having a porous plate 33 partly over the bottom, wherein an inner cylinder 35 is provided over the plate with a space 43 between the bottom end of the cylinder and the porous plate forming a fluidizing region mainly limited to inside and lower part of the cylinder so that the top end of the inner cylinder 35 is positioned lower than the powder level under operation to save the fluidizing air, thereby making dust-collection treatment in the fluidizing air unnecessary. (Fluidization is mainly carried out inside of the inner cylinder 35 and fine powders included in the fluidizing air is collected by the bulk powder layer over the inner cylinder 35, practically making dust-collection treatment of the exhaust air from the hopper unnecessary. Mixing of the powder can be facilitated by the circulation 44 due to the bulk density difference between the fluidized part and the bulk part in the hopper. A vibrator may be added, if necessary.) A hopper in which a Partial fluidizing device is provided at the bottom end of the suction pipe, and a hopper in which the powder material is always constantly fed at the inlet of the suction pipe by means of a vibration device or a stirring device with no use of fluidizing means may be also available. Although the powder material is usually taken out by sucking up the powder from the top portion of the hopper for convenience as described in the forgoing examples, the method is not necessarily limited thereto but it is possible to take out from the side face or bottom part of the hopper. The dispersion means 3 and measuring tube 1 can be installed along any direction besides the vertical direction, if necessary. A high-precision instrument for measuring the mass flow rate of powder conveyed together with a gas and a constant powder feeder based on the instrument can be obtained by providing the measuring tube 1, measuring gas 2 and dispersion means 3 so as to satisfy the principles of the present invention.

The measuring tube 1 to be used in the present invention is required to always have a constant cross sectional area. Change of the cross sectional area due to adhesion can be prevented with respect to common powders by forming its inner surface with a non-adhesive substance such as a fluororesin while a countermeasure for abrasion can be achieved by replacing the measuring tube 1 in every 200 to 500 hours. When a higher durability is required, a surface treatment in which a porous alumina membrane is formed on the inner surface of the measuring tube 1 followed by impregnating with a fluororesin in vacuum, or a composite plating in which fine particles of a fluororesin (PTFE or fluorinated pitch) is dispersed in a metal film such as a nickel film is applied as a countermeasure. These preventive treatments comprise important constructive elements of the present invention. Preventive measures against adhesion and abrasion at the inner surface of the throat 22 of the injector 24 is necessary as well as for the inside of the measuring tube 1. Conventionally, it used to be difficult to solve these problems at the same time. However, these problems can be solved by applying the impregnation surface treatment of the porous alumina with a fluororesin in vacuum, or the composite plating surface treatment using fine particles of a fluororesin, obtaining an injector throat having 3 to 10 times or more of durability. The velocity distribution is stabilized by keeping the Reynolds number of the measuring gas in the measuring tube 1 at 2,300 or more and by generating a turbulent flow over the entire length of the measuring tube 1 for sufficiently dispersing the powder material. Uniform particle distribution in the measuring tube 1 can prevent partial abrasion of the tube and is effective for a long term stabilization of the measuring accuracy. This effect can be more improved by vertically standing the measuring tube.

The method for measuring the pressure difference between the inlet 7 and outlet 8 of the measuring tube 1 is not limited to the method shown in FIG. 1, but the pressure difference can be also detected by an electric means by providing a pressure sensor at the inlet 7 and outlet 8, respectively, in order to simplify the mechanical structure by omitting to use a pressure guide tube. In some cases, the pressure at the inlet of the measuring tube can be measured in the powder upstream of the dispersion means 4.

Although the conveying air flow rate for the powder required to flow in the pipe 20 for conveying the powder to the gun 25 may be changed in a wide range depending on the conditions such as the shape of an object to be coated or required coating film thickness in the electrostatic powder coating system according to the present invention as shown in FIG. 1, the flow rate can be always maintained at a constant speed irrespective of the overall operational conditions of the system by forming the inner diameter of the measuring tube 1 by ½ to ¼ as small as the inner diameter of the pipe 20, thereby the flow rate of the measuring gas 2 is reduced to ⅓ to ⅒ of the air flow rate required in the pipe 20.

Characteristics of the powder mass flow meter according to the present invention do not necessarily need to be checked by on-site measurements in the calibration of characteristics at the manufacturing process or in the periodic inspection and maintenance after installation. Calibration and adjustment can be performed by connecting an air flow meter to the powder introduction means 5 in FIG. 1, operating the system by sucking the air instead of the powder and verifying the relation between the sucked air flow rate and the output of the flow meter. This is practically very convenient.

The powder dispersion means applied in the powder mass flow meter according to the present invention is not limited to the embodiment of the mechanism shown in FIG. 1, but a variety of methods based on the principles of the present invention are available. For example, the slits for creating thin-layer high-speed gas streams can be replaced with a closely-arrayed series of small holes. The powder can be cross-dispersed by allowing high-speed gas streams to form thin-layers by providing a diffuser at the top end of the powder introduction means or at the outlet of the measuring gas.

While the embodiment in which the powder feeder is provided upstream of the powder mass flow meter according to the present invention is hitherto described, the present invention is not limited to this, but another method is also included within the scope of the present invention, wherein the powder mass flow meter according to the present invention is provided downstream of a volumetric type constant powder feeder, which can be any one of a vibration type, roll groove type, table type or screw type so that the volumetric type constant powder feeder is controlled by feed-back control by the output of the powder mass flow meter, thereby enabling to obtain a mass flow rate constant powder feeder.

When the powder is fed by conveying it with a gas as shown in the embodiment in FIG. 1, the feeding rate of the powder can be accurately controlled within the set value along with suppressing the fluctuation of the conveying gas flow rate so as to be smaller than that of in the prior art. It is also possible to keep the conveying gas flow rate at a constant set value. By applying the powder feeder according to the present invention to a paint feeder of an electrostatic powder coating apparatus, making it possible to accurately keep the powder discharge rate of an electrostatic powder gun at a constant value, at the same time, the discharge speed and dispersion state of the discharged powder, that is, the discharge pattern, can be maintained in a constant optimum condition, making it possible to obtain a high transfer efficiency and uniform film thickness distribution. Thus, a high-performance electrostatic powder coating apparatus enabling to largely save the consumption of powder and to ensure a high product quality is obtained. The present invention is applicable to a variety of electrostatic powder coating guns for electrostatically coating powder by charging the powder with a corona discharge or tribo-electric charging. In FIG. 1, illustrations of a power source for a gun 25, discharge pattern control and operation system is omitted. The powder mass flow meter hitherto described can be used for various ways in the same purpose besides electrostatic powder coating.

Industrial Applicability

According to the present invention, a gas convey type mass flow meter that can measure the mass flow rate of the powder conveyed by a gas without being affected by the kind and physical properties of the powder is obtained, which used to be impossible to obtain in the prior art. By combining this mass flow meter with a powder feeder of which feeding rate is adjustable, it is possible to obtain a constant powder feeder controlled by a sensor-based feed-back control by the mass flow meter. Since the characteristics and accuracy of the system according to the present invention are practically not influenced by the kind and physical properties of the powder, or by the operational conditions along with no need of on-site actual measuring, resulting in obtaining the systems having uniform characteristics. The system is especially suitable for parallel running of a plurality of systems or for multiple-color changes or powder changes in powder coating where a variety of powder materials are alternately used. The system itself has a small-sized and simple structure besides requiring no on-site calibration, so that manufacturing process of the system can be managed only by adjusting its size and electrical characteristics. Moreover, the system is so cheap along with being able to largely reduce the cost for installation, adjustment and maintenance.

Cleaning of the powder mass flow meter, the constant powder feeder and the electrostatic powder coating apparatus according to the present invention can be performed in a short period of time without being disassembled. Therefore, the time required for the color change of the powder becomes so short that an effective net working rate of the system can be enhanced.

What is claimed is:

1. A powder mass flow meter comprising:
   a measuring tube having an inlet and outlet,
   a powder introduction means for introducing powder into said measuring tube,
   a dispersion means for successively shearing off the terminal end of a column of bulk powder into thin layers at the output port of said powder introduction means and for conveying the powder into said measuring tube by means of a measuring gas which is spout out from slits toward the axis of said powder column as high-speed thin layer gas streams, said slits being provided around the almost entire circumference of an inner wall of the output port of said powder introduction means, thereby said powder is dispersed into powder particles suspended in the measuring gas and conveyed into the measuring tube, and
   a sensor for measuring a pressure difference between the inlet and outlet of said measuring tube.

2. The powder mass flow meter according to claim 1, wherein the Reynolds number of the flow rate of the measuring gas in said measuring tube is 2,300 or more.

3. The powder mass flow meter according to claim 1, wherein said powder mass flow meter includes a flow rate setting means, said powder mass flow meter including a powder feeder having a control function for allowing the output value of said powder mass flow meter to coincide with its set value.

4. The powder mass flow meter according to claim 3, wherein said powder feeder includes a powder hopper and an injector comprising a throat and a nozzle.

5. The powder mass flow meter according to claim 1 further comprising a powder paint feeder comprising an injector for use in electrostatic powder coating having a nozzle at an inlet of a throat of the injector and having an air blowing port at an outlet of said throat, wherein a control valve for said nozzle and a control valve for air blowing are connected to each other so that they act in a reverse motion, and said valves are connected to an outlet port of a constant flow valve at the upstream of said valves.

6. The powder mass flow meter according to claim 5, wherein said control valve for said nozzle and said control valve for air blowing are connected to an outlet port of a constant flow valve at the upstream of said valves.

7. The powder mass flow meter according to claim 5, wherein powder is fed to an electrostatic powder coating apparatus by means of said electrostatic powder paint feeder.

8. The powder mass flow meter according to claim 5, wherein powder is fed by means of a powder mass flow meter.

9. An electrostatic powder coating apparatus, wherein powder is fed by said powder paint feeder according to claim 5.

10. An electrostatic powder coating apparatus, wherein powder is fed by said powder mass flow meter according to claim 1.

11. An electrostatic powder coating apparatus, wherein powder is fed by said powder mass flow meter according to claim 5.

12. An electrostatic powder coating apparatus, wherein powder is fed by said powder mass flow meter according to claim 4.

13. An electrostatic powder coating apparatus, wherein powder is fed by said powder mass flow meter according to claim 3.

14. The powder mass flow meter according to claim 4 further comprising a powder paint feeder comprising an injector for use in electrostatic powder coating having a nozzle at an inlet of a throat of the injector and having an air blowing port at an outlet of said throat, wherein a control valve for said nozzle and a control valve for air blowing are connected to each other so that they act in a reverse motion, and said valves are connected to an outlet port of a constant flow valve at the upstream of said valves.

15. The powder mass flow meter according to claim 3 further comprising a powder paint feeder comprising an injector for use in electrostatic powder coating having a nozzle at an inlet of a throat of the injector and having an air blowing port at an outlet of said throat, wherein a control valve for said nozzle and a control valve for air blowing are connected to each other so that they act in a reverse motion, and said valves are connected to an outlet port of a constant flow valve at the upstream of said valves.

* * * * *

UNITED STATES PATENT AND TRADEMARK OFFICE
CERTIFICATE OF CORRECTION

PATENT NO. : 6,176,647 B1
DATED : January 23, 2001
INVENTOR(S) : Tsutomu Itoh

It is certified that error appears in the above-identified patent and that said Letters Patent is hereby corrected as shown below:

Column 1,
Line 13; Delete "said".

Column 2,
Line 57; "as" should be -- such a --.
Line 63; Delete "said".

Column 5,
line 54; Before "disassembling" insert -- the --.

Column 8,
line 26; Delete "the".

Column 11,
Line 48; "Partial" should be -- partial --.

Signed and Sealed this

Fourteenth Day of August, 2001

*Attest:*

Nicholas P. Godici

*Attesting Officer*

NICHOLAS P. GODICI
*Acting Director of the United States Patent and Trademark Office*